July 2, 1940.   D. B. DICKERSON   2,206,456
MANUALLY OPERABLE CONTROL MECHANISM
Filed March 5, 1937
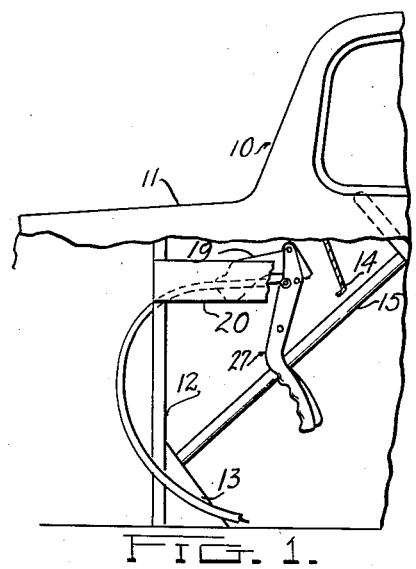
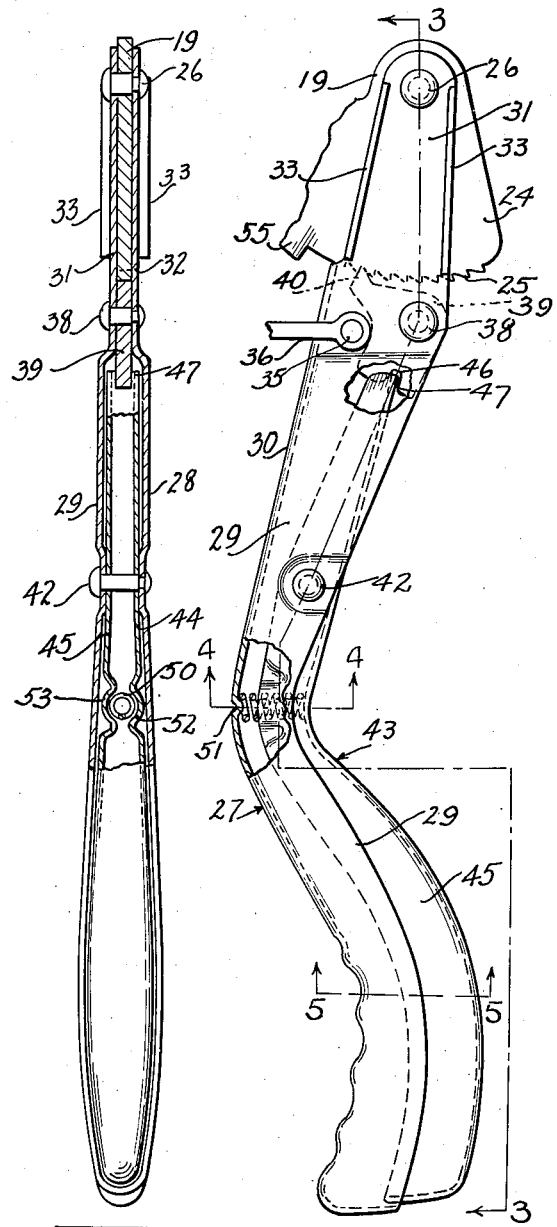
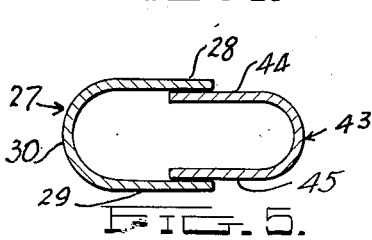
Inventor
Dorman B. Dickerson.
By Braselton Whitcomb & Davies
Attorneys Patented July 2, 1940

2,206,456

UNITED STATES PATENT OFFICE 2,206,456

MANUALLY OPERABLE CONTROL MECHANISM

Dorman B. Dickerson, Toledo, Ohio, assignor to The Logan Gear Company, Toledo, Ohio, a corporation of Ohio Application March 5, 1937, Serial No. 129,183

1 Claim. (Cl. 74—537)

This invention relates to manually operable control mechanism and particularly to a lever mechanism suitable for use as an emergency brake lever on a motor vehicle.

The invention embraces the provision of a lever mechanism embodying clutching means wherein the manually operable member may be moved to and locked in any desired portion.

An object of the present invention is the provision of a lever mechanism very effective for controlling the operation of braking mechanisms wherein the extent of movement of the lever to brake applying position varies under operating conditions.

A further object of the invention is the provision of a lever mechanism including simple and improved means for positively locking the lever in any position of adjustment and quickly release the same without the necessity of applying great force.

Another object of the invention is the provision of lever mechanism including a releasing member coextensive with the brake operating lever forming therewith a closed compartment for enclosing the operating means.

A further object of the invention is the provision of a lever wherein the grip portion is formed by coextensive overlapping portions of the lever and clutch operating member whereby pinching of the operator's hand is prevented when the mechanism is operated.

A further object of the invention is the provision of a lever mechanism of rugged construction formed from thin sheet material of great simplicity which is very inexpensive to manufacture and which is thoroughly dependable in operation.

Further objects and advantages are within the scope of this invention such as relate to the arrangement, operation and function of the related elements of structure, to various details of construction and to combinations of parts, elements per se, and to economies of manufacture and numerous other features as will be apparent from a consideration of the specification and drawing of a form of the invention, which may be preferred, in which:

Figure 1 is a fragmentary side elevational view of the forward portion of an automotive vehicle, a portion of the side wall being broken away to illustrate a method of mounting the mechanism control arrangement of my invention;

Figure 2 is a side elevational view of the preferred form of the mechanism control of my invention and a support therefor;

Figure 3 is a longitudinal sectional view taken substantially upon the line 3—3 of Figure 2;

Figure 4 is a transverse sectional view taken substantially on the line 4—4 of Figure 2;

Figure 5 is a transverse detail sectional view taken substantially on the line 5—5 of Figure 2;

Figure 6 is a fragmentary detail view showing the clutch arrangement and a portion of the releasing means therefor.

I have illustrated the manually operable control mechanism of my invention as particularly utilized with the emergency brake mechanism for automotive vehicles, but it is to be understood that I contemplate the utilization of the invention in association with any other type of mechanism.

Referring to the drawing in detail and particularly Figure 1, I have illustrated portion 10 of an automotive vehicle body, the latter being provided with cowl portion 11, a dash portion 12, toe board 13, instrument board 14, and steering post or column 15. In order to increase the leg room and the comfort of the driver of the vehicle, the emergency brake control mechanism is mounted in such a manner that the manipulating means can be conveniently operated by the driver of the vehicle. The control mechanism of the invention is preferably mounted adjacent the left side wall of the vehicle body as viewed from the driver's position and is carried by a support or bracket 19 secured to the cowl frame construction 20 or other suitable portion of the vehicle. The lever support is preferably mounted adjacent to the instrument board 14 and is held in place to cowl frame 20 by suitable means.

In the present embodiment of the invention the bracket 19 forms the supporting means for the lever mechanism and is preferably provided with a vertically arranged uniplanar portion 24 having a lower curved edge portion serrated or grooved to form a series of ratchet or clutch teeth 25.

Pivotally connected to the uniplanar portion 24 by means of a pin 26 is a lever or lever member 27 preferably formed of thin sheet metal. As illustrated, the lever member is of U-shaped configuration having side wall portions 28 and 29 connected by web portion 30, which configuration lends stiffness and rigidity to the construction. The web portion 30 terminates just beneath the lower edge of the uniplanar portion 24 whereby the upper part of the lever member is formed with two side wall projecting portions 31 and 32 which are adapted to straddle the uniplanar portion 24. The side wall projecting portions 31 and 32 are each formed with bent portion 33 forming lateral reinforcing flanges. The side walls 28 and 29 of the lever member are provided with aligned openings to receive a pin 35 passing through a clevis member 36 which in turn is adapted to be operatively connected to the emergency brakes of the vehicle.

The side walls 28 and 29 of the lever member are also provided with registering openings adapted to receive a pin 38 on which is journalled or pivoted between the lever side walls a pawl or clutch member 39 having a projection 40 adapted for cooperation with the ratchet teeth 25 of the uniplanar portion 24 of the support 19.

The side wall portions 28 and 29 of the lever member are provided with registering openings adapted to receive a pin 42 which serves to pivotally connect a clutch or pawl actuating member 43 preferably formed of sheet metal and a U-shaped cross section having suitable dimensions so that the side walls 44 and 45 snugly fit between the side walls 28 and 29 of the lever member. The pawl actuating member is preferably positioned with respect to the lever member so that the bight of the U-shaped sections are in opposition thereby closing the space between the side walls. The pawl or clutch member 39 is also provided with a recess 46 which is adapted to receive the upper extremity or end portion 47 of the bight of the clutch manipulating or releasing member 43 as illustrated in Figures 2 and 6. The lever member and the clutch actuating member are curved as illustrated in Figure 1 at their intermediate portions to accommodate the instrument panel of the vehicle when the mechanism control is moved to brake setting position.

For the purpose of urging the pawl or clutch member 39 into cooperative engagement with the ratchet teeth 25 of the lever support 19, I have provided spring means. In the embodiment illustrated, as shown in Figure 4, the spring means consists of a coil spring member 50 which is retained in position through a depression 51 formed on the bight portion or web 30 of the lever member 27 and by the formation of semi-circular configurations 52 and 53, each of the side wall portions 44 and 45 of the clutch releasing member 43 forming a compartment of suitable diameter to accommodate the coil spring 50. The spring member 50 in the present embodiment not only serves to urge the pawl 39 into contact with the ratchet teeth 25 at all times but through the position of the spring between the clutch manipulating member and lever proper, tension is placed therebetween so as to prevent rattling or noises caused due to slight relative movement of the parts produced by vibration arising during the operation of the vehicle.

The mechanism control as illustrated in Figures 1 and 6 is in brake released position. When it is desired to apply or "set" the brakes, the operator of the vehicle compresses the grip portion thereby moving the clutch releasing member 43 towards the lever member 27 and swinging the lever member about the pivot pin 26 in a counter-clockwise direction as viewed in Figure 1, causing the projection 40 of the pawl or clutch member 39 to move successively over the teeth 25 until the brakes are applied or in "set" position, the pawl projection 40 engaging one of the teeth to prevent return of the lever member, as shown in Figure 2. When it is desired to release the brakes, the operator compresses handle portions of the lever 27 and the handle portion of the clutch releasing member 43 to swing back in a clockwise direction about the pivot pin 26 causing the upper extremity 47 of the clutch releasing member in engagement with the recess 46 of the pawl 39 to withdraw the pawl tooth 40 from engagement with the ratchet teeth 25 against the tension of spring 50. A clockwise movement of the lever member about its pivotal support may then be had as the pawl member is held out of engagement with the ratchet teeth and the brakes thus released.

For the purpose of limiting the clockwise movement of the lever about its pivotal axis, stop means are provided. In the embodiment illustrated in Figure 2, the stop means consist of a projection 55 adapted to engage the bight portion or web 30 of the lever member 27, the projection 55 forming an integral part of the uniplanar section 24 of the support 19. If desired, other types of stop means than the one illustrated may be secured to the support 19 without departing from the spirit of the invention.

It is apparent that within the scope of the invention, modifications and different arrangements may be made other than is herein disclosed, and the present disclosure is illustrative merely, the invention comprehending all variations thereof.

What I claim is:

In combination, a mechanism control including a support having a toothed surface formed thereon; a lever member formed of sheet metal and of U-shaped cross section throughout a major portion of its length, said lever member being pivotally connected to said support and depending therefrom; a pawl pivoted upon said lever member between the side walls thereof and engageable with the toothed surface on said support, said lever member terminating at its lower end in a hollow hand grip portion; a pawl actuating member formed of sheet metal of U-shaped configuration throughout its length having its side walls extending into the U-shaped configuration of said lever member, the side walls of said lever member and said pawl actuating member being pivotally connected together, said pawl actuating member having an integral manipulating portion extending into the hollow hand grip portion of said lever member; and a coil spring carried within the U-shaped cross section of said pawl actuating member for normally urging said pawl into cooperative engagement with the toothed surface formed on said support, the side walls of the U-shaped section of the pawl actuating member having a partially circular configuration forming a compartment for retaining said coil spring in position.

DORMAN B. DICKERSON.